United States Patent
Grimmer et al.

(10) Patent No.: US 9,740,463 B2
(45) Date of Patent: Aug. 22, 2017

(54) MECHANISM FOR INCREASING THE PERFORMANCE OF MULTIPLE LANGUAGE PROGRAMS BY INSERTING CALLED LANGUAGE IR INTO THE CALLING LANGUAGE

(71) Applicant: Oracle International Corporation, Redwood Shores, CA (US)

(72) Inventors: Matthias Grimmer, Linz (AT); Chris Seaton, Heswall (GB); Thomas Wuerthinger, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 62 days.

(21) Appl. No.: 14/822,489

(22) Filed: Aug. 10, 2015

(65) Prior Publication Data

US 2017/0046137 A1     Feb. 16, 2017

(51) Int. Cl.
*G06F 9/45* (2006.01)
(52) U.S. Cl.
CPC . *G06F 8/41* (2013.01); *G06F 8/51* (2013.01)
(58) Field of Classification Search
CPC .................. G06F 8/41; G06F 8/51; G06F 8/52
USPC .................................................. 717/140, 146
See application file for complete search history.

(56) References Cited

U.S. PATENT DOCUMENTS

| | | | |
|---|---|---|---|
| 5,946,489 A | 8/1999 | Yellin et al. | |
| 7,219,338 B2 * | 5/2007 | Venter | G06F 8/427 717/140 |
| 7,447,624 B2 | 11/2008 | Fuhrmann | |
| 8,312,439 B2 | 11/2012 | Kielstra et al. | |
| 2007/0044066 A1 | 2/2007 | Meijer et al. | |
| 2008/0295070 A1 * | 11/2008 | Bozza | G06F 8/51 717/106 |

OTHER PUBLICATIONS

Barrett, E. et al., "Unipycation: A Case Study in Cross-Language Tracing", Sep. 17, 2013. (10 pages) <http://eddbarrett.co.uk/pubs/pdf/barrett2013unipycation.pdf>.
Anand, K., et al., "A compiler level intermediate representation based binary analysis and rewriting system", University of Maryland, College Park, Apr. 15-17, 2013. (14 pages) <http://www.ece.umd.edu/~kapil/pdf/eurosys2013.pdf>.
Meyer, B., "Multi-language programming: how .NET does it", Software Development "Beyond Objects", column: May, Jun. and Jul. 2002 issues. (20 pages) <http://se.ethz.ch/~meyer/publications/softdev/multi-language.pdf>.

(Continued)

*Primary Examiner* — Anna Deng
(74) *Attorney, Agent, or Firm* — Osha Liang LLP

(57) ABSTRACT

A method and system of cross-language inlining that includes receiving source code of a multiple language program, the source code including a main language and a first access of a first foreign object in a first additional language; translating the main language to obtain a main language intermediate representation (IR); translating the first additional language to obtain a first IR snippet; composing, before performing a compilation, the main language IR and the first IR snippet to obtain a cross-language IR; and performing the compilation of the cross-language IR to obtain machine code corresponding to the multiple language program.

20 Claims, 11 Drawing Sheets

(56) References Cited

OTHER PUBLICATIONS

David Chisnall, "Cross-Language Interoperability for Fast, Easy, and Maintainable Code", University of Cambridge, May 31, 2013 (1 page) <https://www.cl.cam.ac.uk/events/cl75/posters/f/dc552-screen.pdf>.
Chisnall, David "The Challenge of Cross-language Interoperability" Nov. 19, 2013 (9 pages).

\* cited by examiner

MECHANISM FOR INCREASING THE PERFORMANCE OF MULTIPLE LANGUAGE PROGRAMS BY INSERTING CALLED LANGUAGE IR INTO THE CALLING LANGUAGE

BACKGROUND

Computer programs are often primarily written in one programming language. However, in some instances, a program may be a multiple language program in which one or more additional languages are utilized. For example, a program may call a routine or access information of using another programming language in order, for example, to utilize modules already written in the other language to perform some task, or to allow different parts of a system to utilize the most appropriate language. The performance of the program during execution may be higher when executing portions of the program written in the primary language than those of a secondary language. Additionally, the work necessary to allow use of a second language may be costly and/or time consuming. Furthermore, moving from one language to another language often requires using an additional compilation unit to allow one or more compilers to compile the multiple language program. Compiling a multiple language program from multiple compilation units may reduce the number of modification (e.g., optimization) opportunities for the program.

SUMMARY

In general, in one aspect, the invention relates to a method of cross-language inlining that includes receiving source code of a multiple language program, the source code including a main language and a first access of a first foreign object in a first additional language; translating the main language to obtain a main language intermediate representation (IR); translating the first additional language to obtain a first IR snippet; composing, before performing a compilation, the main language IR and the first IR snippet to obtain a cross-language IR; and performing the compilation of the cross-language IR to obtain machine code corresponding to the multiple language program.

In general, in one aspect, the invention relates to a system for cross language inlining that includes a machine code generation unit configured to receive source code of a multiple language program, the source code comprising a main language and a first access of a first foreign object via a first additional language. The machine code generation unit includes a first translator configured to translate the main language to obtain a main language intermediate representation (IR); a second translator configured to translate the first additional language to obtain a first IR snippet; a cross-language IR generation module configured to compose the main program IR and the first IR snippet to obtain a cross-language IR; and a compiler configured to perform a compilation of the cross-language IR to obtain machine code corresponding to the multiple language program.

In general, in one aspect, the invention relates to a non-transitory computer readable medium that includes instructions which, when executed by a computer processor, perform a method of cross-language inlining that includes receiving source code of a multiple language program, the source code comprising a main language and a first access of a first foreign object in a first additional language; translating the main language to obtain a main language intermediate representation (IR); translating the first additional language to obtain a first IR snippet; composing, before performing a compilation, the main language IR and the first IR snippet to obtain a cross-language IR; and performing the compilation of the cross-language IR to obtain machine code corresponding to the multiple language program.

Other aspects of the invention will be apparent from the following description and the appended claims.

DETAILED DESCRIPTION

Figure 1:
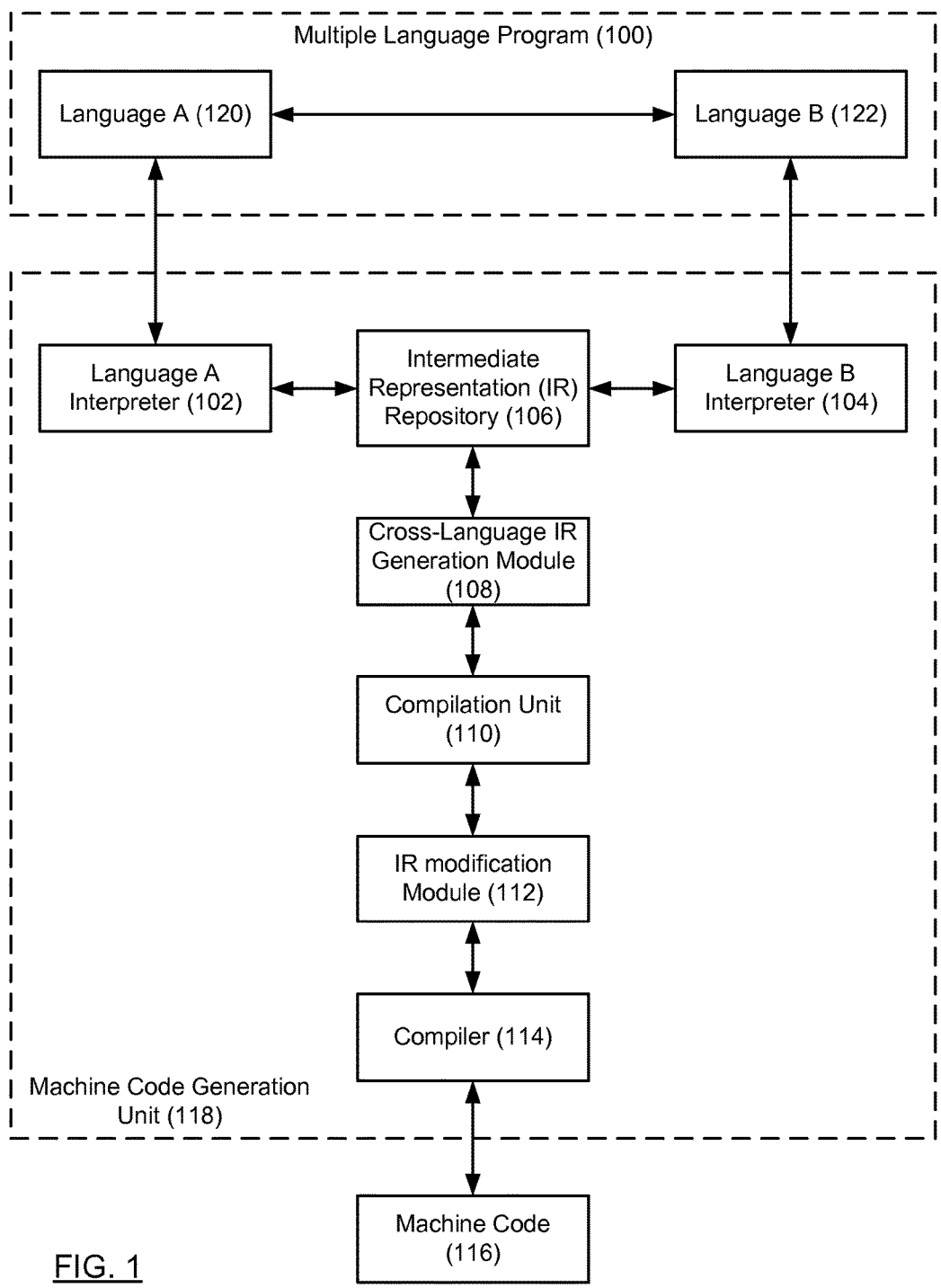
FIG. 1 shows a system in accordance with one or more embodiments of the invention.

Specific embodiments of the invention will now be described in detail with reference to the accompanying figures. Like elements in the various figures may be denoted by like reference numerals and/or like names for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for performing cross-language inlining for a multiple language program before the multiple language program is compiled by a compiler. Specifically, in one or more embodiments of the invention, a program that utilizes two or more programming languages (i.e., a multiple language program) is received by a machine code generation unit and, after a series of actions, is compiled into machine code. More specifically, in one or more embodiments of the invention, before compilation, source code of each language of the program is translated to an intermediate representation (IR) (e.g., abstract syntax tree (AST)), which is then interpreted (i.e., executed) by an interpreter. In one or more embodiments of the invention, the IR may include the functionality of an interpreter, and as such, may include functionality to execute itself. The IRs for the various languages of the multiple language program are then composed into a single cross-language IR before being passed to a compiler for the compilation. Various modifications may also be implemented in the IR by an interpreter during runtime before the IR of the multiple language program is compiled and/or during compilation. For example, if the IR is an AST, while the program is being executed via interpretation, various node replacements may occur. Such node replacements may represent specializations or optimizations that improve some aspect of the program, such as execution speed and/or program size.

FIG. 1 shows a system in accordance with one or more embodiments of the invention. As shown in FIG. 1, the system includes a multiple language program (100) that includes source code in two or more languages (e.g., language A (120), language B (122)). The multiple language program (100) may be provided to a machine code generation unit (118). The machine code generation unit (118) may include two or more language interpreters (e.g., language A interpreter (102), language B interpreter (104)), an intermediate representation (IR) repository (106), a cross-language IR generation module (108), a compilation unit (110), an IR modification module (112), and a compiler (114). The compiler may produce machine code (116). Each of these components is described below.

In one or more embodiments of the invention, a multiple language program (100) is a computer program. A computer program may be any sequence of instructions, written as source code in any number of any programming languages (e.g., Java, Ruby, C, C++, JavaScript, Python, Perl, etc.) now known or that may be later developed. A computer program may be a syntactic and semantic method of expression for communicating a program's instructions to a computing device. As used herein, a multiple language program (100) is any program that utilizes (i.e., includes source code expressed in) at least two programming languages (e.g., language A (120), language B (122)). For example, the multiple language program (100) may be written source code of a main language (e.g., language A (120)), and include certain portions written in source code of one or more additional languages (e.g., language B (122)).

In one or more embodiments of the invention, a main language of a multiple language program (100) is the language, out of the various languages of the multiple language program, in which the greatest quantity of source code is expressed. Additional languages may be used instead of the main language for certain actions, for example, to avoid unnecessarily having to rewrite code, to use code that is more appropriate for performing a given task, to use the most appropriate code when making use of a given type of hardware of an underlying computing device, and/or for any other reason as decided by the entity that generates the source code of the multiple language program (100).

In one or more embodiments of the invention, the additional languages may be used, for example, to access data (e.g., an object) and/or to call functions using the additional language. In one or more embodiments of the invention, an object (not shown) that is being accessed in a multiple language program (100) by its language of origin (e.g., the main language) may be referred to as a regular object. For example, if the main language of the multiple language program is Ruby, and a Ruby object is used by the Ruby portion of the multiple language program, then the object may be considered a regular object. In one or more embodiments of the invention, an object that is being accessed in a multiple language program by a language other than the object's language of origin (e.g., one of the additional languages), then the object may be referred to as a foreign object. For example, if a Ruby object is accessed by a C extension of the multiple language program, then the Ruby object may be considered a foreign object. A foreign object may be an object in any language of the multiple language program (100) that is accessed by any other language of the multiple language program.

An object (not shown) may be a representation of data (e.g., numbers, strings, arrays, functions, etc.) via a collection of one or more properties, such as data attributes, and associated methods, such as routines and procedures to manipulate properties. A method of an object may be a function. As used herein, any non-primitive entity of a multiple language program (100) may be referred to as an object. For example, object may refer to Ruby objects, classes, modules and/or methods. As another example, object may refer to C intermediate values and/or pointers.

In one or more embodiments of the invention, a multiple language program (100) may be provided to a machine code generation unit (118). In one or more embodiments of the invention, a machine code generation unit (118) is any hardware, circuitry, integrated circuit(s), software, firmware, and/or any combination thereof capable of receiving a program (e.g., multiple language program (100)) and, after performing a series of steps (e.g., interpretation, IR modification, compilation, etc.) to translate the program into machine code (116) that may be stored and/or executed. In one or more embodiments of the invention, the machine code generation unit (118), and/or one or more components therein, includes functionality to execute the multiple language program (100). Execution of the multiple language program (100) may occur via interpretation, during compilation, after compilation, and/or any combination thereof. In one or more embodiments of the invention, the machine code generation unit (118) executes on one or more computing devices.

In one or more embodiments of the invention, a computing device is any device and/or any set of devices (e.g., a distributed computing system) capable of electronically processing instructions, serially or in parallel, and that includes at least the minimum processing power, memory, input and output device(s), operatively connected storage device(s) and/or network connectivity in order to contribute to the performance of at least some portion of the functions described in accordance with one or more embodiments of the invention. Examples of computing devices include, but are not limited to, one or more server machines (e.g., a blade-server in a blade-server chassis), virtual machines (VMs), desktop computers, mobile devices (e.g., laptop computer, smartphone, personal digital assistant, tablet computer, and/or any other mobile computing device), and/or any other type of computing device with the aforementioned minimum requirements.

In one or more embodiments of the invention, the machine code generation unit (118) includes one or more interpreters (e.g., language A interpreter (102), language B interpreter (104)). An interpreter may be a computer program that includes functionality to first translate the source code of a program (e.g., multiple language program (100)) into an IR, and then to execute the IR via interpretation. In one or more embodiments of the invention, an IR, once translated, may be include the functionality of an interpreter and, as such, may include functionality to execute itself. Additionally or alternatively, though not shown in FIG. 1, the machine code generation unit (118) may include any number of translators that include functionality to translate one or more languages of a multiple language program (100) into an IR, which then, performing the functionality of an interpreter, executes itself. In one or more embodiments of the invention, each element of an IR (e.g., each AST node) has an interpreter unit directly embedded, which provides the IR functionality to execute itself after the translation occurs. For example, if the IR is an AST, an add node of the AST may include functionality to compute the sum.

An interpreter (e.g., language A interpreter (102), language B interpreter (104)), which may be implemented via division into units that are integrated into IR elements, may include functionality to execute an IR of a program for at least some period of time without necessarily compiling the program into machine code (116). For example, an IR of a program may execute until a predefined execution count is reached, and/or, in the case of an interpreter capable of performing AST node replacements (e.g., to specialize/optimize the AST), until the AST reaches a stable state with no more node replacements occurring, after which compilation may occur. Additionally or alternatively, an interpreter may include functionality to execute previously compiled code and/or a combination of an IR and previously compiled code.

In one or more embodiments of the invention, an interpreter (e.g., language A interpreter (102), language B interpreter (104)) is any kind of interpreter for any programming language now known or later developed. The IR of the program generated by an interpreter may take any IR form including, but not limited to: ASTs, bytecodes, graphs, flows, and/or any other suitable IR forms. The machine code generation unit (118) may include any number of interpreters, and at least some portion of the interpreters may be designed to interpret and/or translate source code written in one or more programming languages. For example, language A interpreter (102) may be an IR of source code expressed in the Ruby language, and language B interpreter (104) may be an IR of source code expressed in the C language, with each IR including functionality to execute itself via integrated interpretation units in each element of the IR.

The machine code generation unit (118) may additionally include one or more interpreters capable of executing composed cross-language IRs (discussed further below). In one or more embodiments of the invention, an IR of the main language of a multiple language program may be referred to as a main language IR, and an IR of the one or more additional languages of a multiple language IR may be referred to as IR snippets. In one or more embodiments of the invention, an IR snippet is a non-standalone sequence of an IR and, as such, may be referred to as a fragment of an IR. For example, if a translator translates one or more additional languages of a multiple language program into one or more AST snippet representations, then the AST snippets may be an AST sub-trees.

In one or more embodiments of the invention, the machine generation unit (118) also includes an IR repository (106). In one or more embodiments of the invention, the IR repository (106) is a data repository and includes functionality to store IRs generated by an interpreter and/or a translator based on various languages of an input multiple language program. Stored IRs may include, but are not limited to main language IRs and IR snippets. In one or more embodiments of the invention, a data repository is any type of storage unit and/or device (e.g., random access memory (RAM), a file system, database, collection of tables, or any other storage mechanism) for storing data/information. Specifically, the IR repository (106) may include hardware, circuitry, integrated circuit(s) and/or software. Further, the IR repository (106) may include multiple different storage units and/or devices. The multiple different storage units and/or devices may or may not be of the same type or located at the same physical site. In one or more embodiments of the invention, the IR repository (106) is located in memory (e.g., RAM) operatively connected to one or more computing devices. In one or more embodiments of the invention, the IR repository (106) is included as a part of a computing device on which the machine code generation unit (118) executes. In other embodiments of the invention, the IR repository (106) includes one or more stand-alone repositories that are accessible by, at least, the machine code generation unit (118).

In one or more embodiments of the invention, the machine code generation unit (118) also includes a cross-language IR generation module (108). In one or more embodiments of the invention, the cross-language IR generation module (108) includes hardware, circuitry, integrated circuit(s), software, firmware, and/or any combination thereof. For example, the cross-language IR generation module (108) may be software executing on a processing system that includes circuitry and/or integrated circuits along with operatively connected memory. In one or more embodiments of the invention, the cross-language IR generation module (108) includes functionality to compose a cross-language IR using IRs of two or more languages of a multiple language program. For example, the cross-language IR generation module (108) may compose a cross-language IR consisting of a main language IR corresponding to JavaScript source code of the multiple language program and an IR snippet corresponding to Ruby source code of the multiple language program. The cross-language IR generation (108) module may be operatively connected to the IR repository (106) and/or to a modification module (112). Generating a cross-language IR from a main language IR and one or more IR snippets may occur, at least in part, during execution (e.g., interpretation) of the main language IR. The cross-language IR generation module (108) and generation of cross-language IRs are discussed further in the description of FIG. 2 and FIG. 3, below.

In one or more embodiments of the invention, the machine code generation unit (118) also includes a compilation unit (110). In one or more embodiments of the invention, a compilation unit (110) is a representation of source code (e.g., an IR) that may be compiled into a single executable machine code representation of a multiple language program. As such, modifications (e.g., optimization, specialization, constant propagation, etc.) may occur before and/or during compilation of the compilation unit instead of having to cease when switching from a main language to an additional language occurs (e.g., when a foreign object is accessed by the additional language). As used herein, the compilation unit (110) includes IRs of the languages of the multiple language program that have been composed by the cross-language IR generation module (108) as a single cross-language IR. Said another way, a cross-language IR, once composed, may be considered a compilation unit (110).

In one or more embodiments of the invention, the machine code generation unit also includes an IR modification module (112). In one or more embodiments of the invention, an IR modification module (112) includes hardware, circuitry, integrated circuit(s), software, firmware, and/or any combination thereof. In one or more embodiments of the invention, the IR modification module (112) includes at least some of the functionality of an interpreter, such as runtime execution of a cross-language IR. In embodiments of the invention in which the elements of an IR include interpreter units and are thus able to execute themselves, the functionality of the IR modification module may be similarly divided and inserted into the IR elements. In such embodiments, the IR may be referred to as self-modifying.

In one or more embodiments of the invention, the IR modification module (112) includes functionality to perform modifications of a cross-language IR during execution (e.g., interpretation). For example, if the cross-language IR is a cross-language AST, the IR modification module may include functionality to perform node replacements of one or more AST nodes. Such modifications of an IR may, for example, be optimizations intended to improve some aspect of program performance. IR modifications may be based on information (e.g., profiling data) included in a portion of an IR (e.g., an AST node), which may change as the cross-language IR is executed (i.e., interpreted). In one or more embodiments of the invention, the IR modification module (112) also includes functionality to undo any modifications performed on the cross-language IR (e.g., perform de-optimization(s)).

In one or more embodiments of the invention, the machine code generation unit (118) also includes a compiler (114). In one or more embodiments of the invention, a compiler (114) is a computer program designed to transform source code written in one or more programming languages, or IRs of a program, into machine code that is capable of being executed. In one or more embodiments of the invention, the compiler (114) includes functionality to translate (i.e., compile) an IR of a program into machine code that a computing device is configured to execute. For example, the compiler (114) may include functionality to create machine code that, when executed in lieu of direct execution of an IR of a program, improves the execution speed of the program. In one or more embodiments of the invention, the compiler (114) includes functionality to perform compilation of operations or functions as the program is executing (e.g., just-in-time (JIT) compilation). A compiler (114) may execute on the same computing device as the one or more interpreters (e.g., language A interpreter (102), language B interpreter (104)) of the machine code generation unit (118), or may execute on a separate computing device.

In one or more embodiments of the invention, the output of a compiler (114) is machine code (116). In one or more embodiments of the invention, machine code (116) is a set of instructions that may be executed by one or more processors of a computing device. Machine code (116) may be specific to physical and/or virtual hardware of the execution environment for which the machine code was generated. Machine code may be executed after it is generated by a compiler (114). Additionally or alternatively, machine code (116) may be stored in memory (not shown) and/or a storage device (not shown) for future execution.

While FIG. 1 shows a configuration of components, other configurations may be used without departing from the scope of the invention. For example, various components may be combined to create a single component. As another example, the functionality performed by a single component may be performed by two or more components. Accordingly, embodiments disclosed herein should not be considered limited to the specific arrangements of modules and elements shown in FIG. 1.

Figure 2:
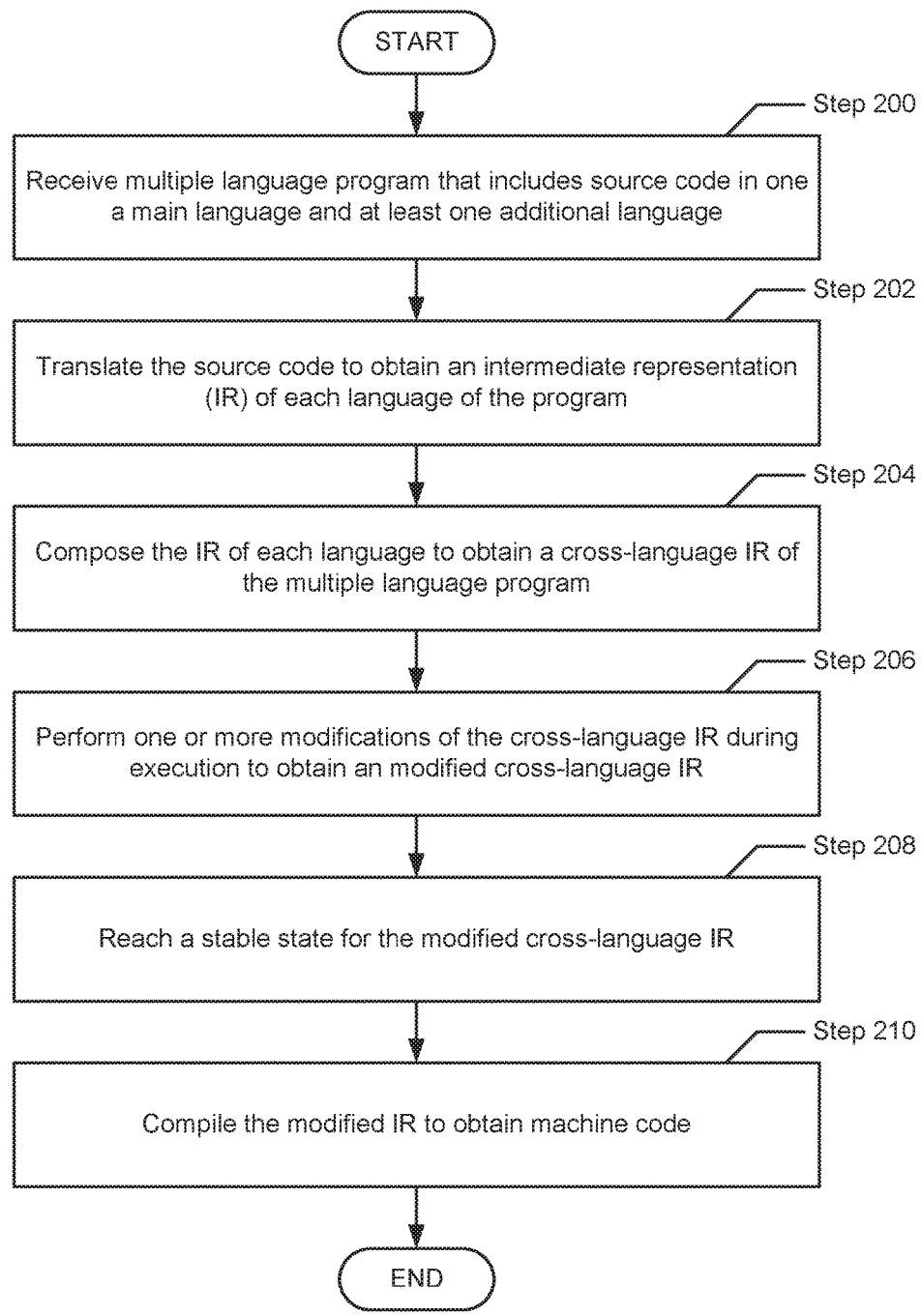
FIG. 2 shows a flowchart in accordance with one or more embodiments of the invention.
Figure 3:
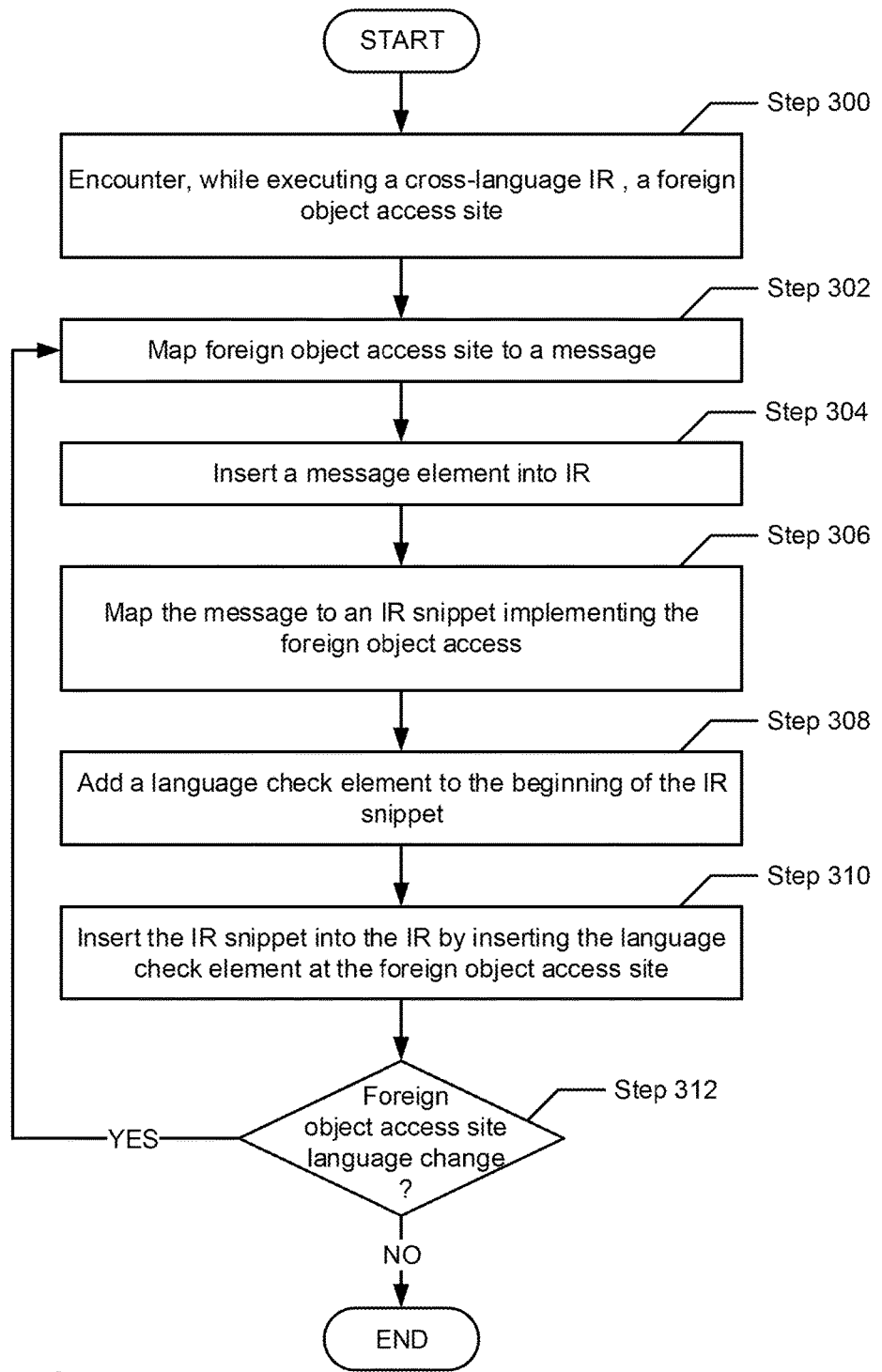
FIG. 3 shows a flowchart in accordance with one or more embodiments of the invention.

FIG. 2 and FIG. 3 show flowcharts in accordance with one or more embodiments of the invention. While the various steps in this flowchart are presented and described sequentially, one of ordinary skill in the art and having the benefit of this detailed description will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method of performing cross-language inlining for a multiple language program before compilation in accordance with one or more embodiments of the invention.

In Step 200, a multiple language program is received. In one or more embodiments of the invention, the multiple language program is received by a machine code generation unit and includes source code expressed in a main language and at least one additional language. A multiple language program may be received from any suitable source. For example, the multiple language program may be received from a user of a computing device. As another example, the multiple language program may be obtained (e.g., via a network, from another computing device, from within a given execution environment, etc.) automatically in order to achieve some goal or perform some task on a computing device. As used herein, receipt of a multiple language program may include initiating execution of the program. For example, a user may choose to launch the multiple language program. As another example, the multiple language program may execute automatically for any suitable purpose.

In Step 202, the source code of the main language of the multiple language program and the source code of the at least one additional language is translated by one or more interpreters and/or translators to obtain a main language IR and one or more IR snippets. For example, an interpreter and/or translator for the main language may generate a main language AST and an interpreter and/or translator for the at least one additional language may generate an AST snippet. In one or more embodiments of the invention, the main language IR corresponds to the translated source code of the main language and each IR snippet corresponds to the translated source code of one of the additional languages. In one or more embodiments of the invention, the main language and each of the additional languages have a separate translator and/or interpreter for translating and/or interpreting the language. For example, to translate a multiple language program with Ruby as the main language and that includes C extensions, there may be one translator for translating Ruby and a separate translator for translating C. In other embodiments of the invention, two or more languages may be translated and/or interpreted by a common entity such as a translator or interpreter. In one or more embodiments of the invention, the main language IR and the one or more IR snippets are stored in an IR repository accessible by, at least, a cross-language IR generation module. For example, the main language IR and the one or more IR snippets may be stored in memory (e.g., RAM) of a computing device.

In Step 204, the main language IR and the one or more IR snippets are composed to obtain a cross-language IR. In one or more embodiments of the invention, the cross-language IR is an intermediate representation of the multiple language program. For example, the cross-language IR may be a cross-language AST that includes an translated main language AST and one or more AST snippets, with each AST snippet corresponding to an additional language of the multiple language program. The composition of the cross-language IR may be performed by a cross-language IR generation module. In one or more embodiments of the invention, composition of the cross-language IR may occur during execution (e.g., interpretation) of the main language IR. For example, the cross-language IR generation module may execute the main language IR until a foreign object access site is reached, at which time the cross-language IR generation module may perform a series of steps to insert an IR snippet into the main language IR in order to perform the foreign object access. Such an insertion may be referred to as cross-language inlining. In embodiments of the invention in which a main language IR includes integrated portions of an interpreter, the cross-language IR generation module may include functionality to work in conjunction with the self-executing main language IR to insert IR snippets into the main language IR when a foreign object access site is encountered. Composition of the cross-language IR, and, specifically, insertion of IR snippets into a main language IR, is discussed further in the description of FIG. 3, below.

In Step 206, one or more modifications of the cross-language IR are performed to obtain a modified cross-language IR. In one or more embodiments of the invention, the modifications are one or more optimizations of the cross-language IR. As used herein, modifications of the cross-language IR include undoing any modifications made to the cross-language IR. As an example, during execution of a cross-language AST, the cross-language AST may have any number of nodes replaced, added, and/or removed, and any number of node replacements, additions, and/or deletions undone, by an IR modification module. One of ordinary skill in the art having the benefit of this detailed description will understand that a program execution system capable of performing modifications of an IR during runtime may be referred to as self-optimizing. In one or more embodiments of the invention, modifications may be made to a cross-language IR based on one or more assumptions, and the modifications may be undone in the event that the one or more assumptions turn out to be incorrect. In one or more embodiments of the invention, IR modifications may occur before, during, and/or after the cross-language IR composition described in reference to Step 204, above.

In Step 208, a stable state for the modified cross-language IR is reached. In one or more embodiments of the invention, a stable state is a state in which no additional modifications are to be made to the modified cross-language IR. The stable state may be reached, for example, when a pre-defined execution count of the IR has been reached, when a certain amount of time has passed, when a certain number of modifications have been made, and/or any combination thereof. In the case of the IR being an AST, a stable state may be a state in which there are no more AST node replacements occurring as the cross-language (or modified cross-language) AST is being executed.

In Step 210, the modified cross-language IR is compiled by a compiler to obtain machine code corresponding to the multiple language program. In one or more embodiments of the invention, the modified cross-language IR is a single compilation unit that represents the multiple languages of the multiple language program and, as such, may reduce or eliminate, before compilation occurs, the number of cross-language barriers inherent in a multiple language program. In such embodiments of the invention, the fact that the program is a multiple language program may be transparent to the compiler, which sees only an IR which the compiler includes functionality to compile.

FIG. 3 shows a flowchart describing a method of composing a cross-language IR before compilation in accordance with one or more embodiments of the invention.

In Step 300, a foreign object access site is encountered. For example, a cross-language IR generation module may encounter a foreign object access site during execution (e.g., interpretation) of a main language IR. In such an example, the foreign object access site may be an AST node that includes access of a foreign language in an additional language of the multiple language program, such as a node in which a JavaScript object is to be accessed via Ruby. A foreign object access site, as used herein, refers to a site in an IR at which a foreign object (described above) access occurs and/or at which a primitive value corresponding to a primitive type is accessed.

Although not shown in FIG. 3, a foreign object access site, instead of being an access of a non-primitive type (i.e., a foreign object), may be an access of a primitive type. In such a scenario, in order to exchange primitive values, there may be a defined set of shared primitive types for the various languages of the multiple language program. Values of such shared primitive types may be referred to as shared primitives. Shared primitives may include, for example, signed and unsigned integer types (eight, sixteen, thirty-two, and/or sixty-four bit), as well as floating point types (thirty-two and/or sixty-four bit). A foreign access of a primitive type may return a shared primitive, which may then be mapped into the primitive of the main language.

Continuing with FIG. 3, in Step 302, the foreign object access site is mapped to a message. In one or more embodiments of the invention, a message may be a non-language specific element to be inserted into an IR, and may therefore be referred to as a language agnostic IR element. A message may be any element that may be inserted into an IR and that includes functionality to access an object (e.g., a foreign object) via a common interface that the object implements. In one or more embodiments of the invention, a message may be a method call. In one or more embodiments of the invention, any number of message types may be implemented for accessing objects.

As a non-limiting example, there may be four types of messages that are implemented to account for various possible types of foreign object accesses. In an exemplary embodiment of the invention in which four message types are implemented, the first type of message may be a read message, which is used to read a member of a foreign object denoted by the foreign object's identity. For example, the read message may be used to get properties of a foreign object such as a field or a method, and/or to read elements of an array. The second type of message in the exemplary embodiment of the invention with four messages implemented may be a write message, which is used to write a member of a foreign object denoted by the object's identity. Analogous the read message, the write message may be used to write foreign object properties. A third type of message in the exemplary embodiment of the invention with four messages implemented may be an execute message. An execute message may have arguments, and may be used to evaluate a foreign object. For example, an execute message may be used to evaluate a Ruby method, or invoke the target of a C function pointer. A fourth type of message in the exemplary embodiment of the invention with four messages implemented may be an unbox message. If a foreign object represents a boxed numeric value and receives an unbox message, the unbox message may unwrap the boxed value and return it. For example, if an unbox message is sent to a Ruby fix num, the foreign object may return a four byte integer value of the boxed foreign object.

One having ordinary skill in the art as well as the benefit of the Detailed Description will understand that although four types of messages are described above, there may be any number of messages for performing any type of access. Accordingly, the invention should not be considered limited to the four message types described.

In one or more embodiments of the invention, each object (e.g., foreign object) of a IR of the present invention is required to support one or more messages in order to provide a common interface for access. A foreign object that receives a message may be referred to as a receiver of a message. In one or more embodiments of the invention, an object supporting the messaging system as a receiver may be referred to as a shareable object. A foreign object access may, in some cases, require the use of one or more messages in any combination in order to perform the foreign object access.

In Step 304, one or more messages corresponding to the encountered foreign object access of Step 300 are inserted into the cross-language IR to obtain an intermediate IR. In one or more embodiments of the invention, the one or more message elements corresponding to one or more messages are inserted at the foreign object access site. For example, if the IR is an AST, the one or more messages may be implemented as one or more message nodes and inserted into the AST in the place of the node corresponding to the foreign object access site. In one or more embodiments of the invention, the message is referred to as a language-independent message and/or a language-agnostic message.

In Step 306, the one or more messages of Step 304 are mapped to an IR snippet implementing the foreign object access. In one or more embodiments of the invention, the messages are mapped to an IR snippet by sending the one or more messages to the receiver foreign object implementing the common interface of messaging discussed above in the description of Step 302. The receiver may, instead of returning a value, return an IR snippet (e.g., an IR snippet representing an additional language of the multiple language program) implementing the foreign object access. The IR snippet may include one or more additional language specific elements (e.g., AST nodes) for executing the foreign object access corresponding to the message (e.g., read, write, execute, and/or unbox) on the receiver foreign object.

In Step 308, a language check element is inserted into the IR snippet. In one or more embodiments of the invention, the IR snippet mapped to the one or more messages is specific to a given additional language of the multiple language program. The language check element corresponds to the additional language represented by the IR snippet and is inserted in such a way as to be executed prior to the IR snippet. For example, if the IR snippet is an AST snippet, the language check element may be an AST node that is appended to the beginning of the AST snippet such that execution of the AST snippet would necessarily require execution of the language check element before the AST snippet. The language check element may be any IR element that calls for a check to determine the additional language to which the IR snippet mapped to the one or more messages corresponds.

In Step 310, the IR snippet is inserted into the IR. In one or more embodiments of the invention, the IR snippet with the language check element is inserted into the IR at the foreign object access site encountered in Step 300. In one or more embodiments of the invention, the insertion of the IR snippet and language check element is referred to as message resolution. In one or more embodiments of the invention, after message resolution, the foreign object is accessed directly via the IR snippet rather than by a language-agnostic message. In one or more embodiments of the invention, message resolution eliminates cross-language barriers by composing a cross-language IR as a single compilation unit.

In Step 312, a determination is made as to whether the foreign object access site has a language change. In one or more embodiments of the invention, during the execution of a multiple language program, the receiver (e.g., foreign object) of an access may change if it corresponds to a non-final value, and so the additional language of a foreign object access may change as well. In one or more embodiments of the invention, a foreign object access site has varying receivers and/or varying languages used to access the receivers, then the access may be referred to as language polymorphic. Therefore, there may be a need to check the language of the access before directly accessing a foreign object using a given additional language. In one or more embodiments of the invention, if the receiver foreign object accessed during execution changes and/or is accessed via a different additional language than the additional language previously accessing a foreign object during execution at the foreign object access site, the process returns to Step 302, and the process of message resolution described above in Steps 302 to Step 310 is repeated for the new additional language, resulting in a new IR snippet being obtained and appended to a new language check node corresponding to the new additional language.

Though not shown in FIG. 3, the new language check node and IR snippet may be added to the IR as a chain emanating from the foreign object access site, with the language check nodes representing the chain and each heading an IR snippet corresponding to the additional language of the language check node (see, e.g., FIG. 10). In one or more embodiments of the invention, each time, during execution or the multiple language program before compilation, that the foreign object access site is encountered, the various language check nodes are iteratively performed until the appropriate IR snippet is determined, which is then used to perform the foreign object access. In one or more embodiments of the invention, in Step 312, once all languages accessing a foreign object at the foreign object access site have been resolved via message resolution, the process ends.

Although the above description of FIG. 3 primarily discusses IR snippet insertion into a generic IR, one of ordinary skill in the art and having the benefit of this Detailed Description will recognize that the various steps of FIG. 3 may be performed on a main language IR (e.g., an IR of a multiple language program before modification or cross-language composition), a cross-language IR (i.e., an IR of a multiple language program for which previous IR snippet insertions have occurred), a modified IR (e.g., an IR of a multiple language program for which previous modifications have occurred) and/or a modified cross-language IR (an IR of a multiple language program for which prior modifications and prior additional language IR snippet insertions have occurred).

FIGS. 4A-4G show an example in accordance with one or more embodiments of the invention. The following example is for explanatory purposes only and not intended to limit the scope of the invention.

Figure 4A:
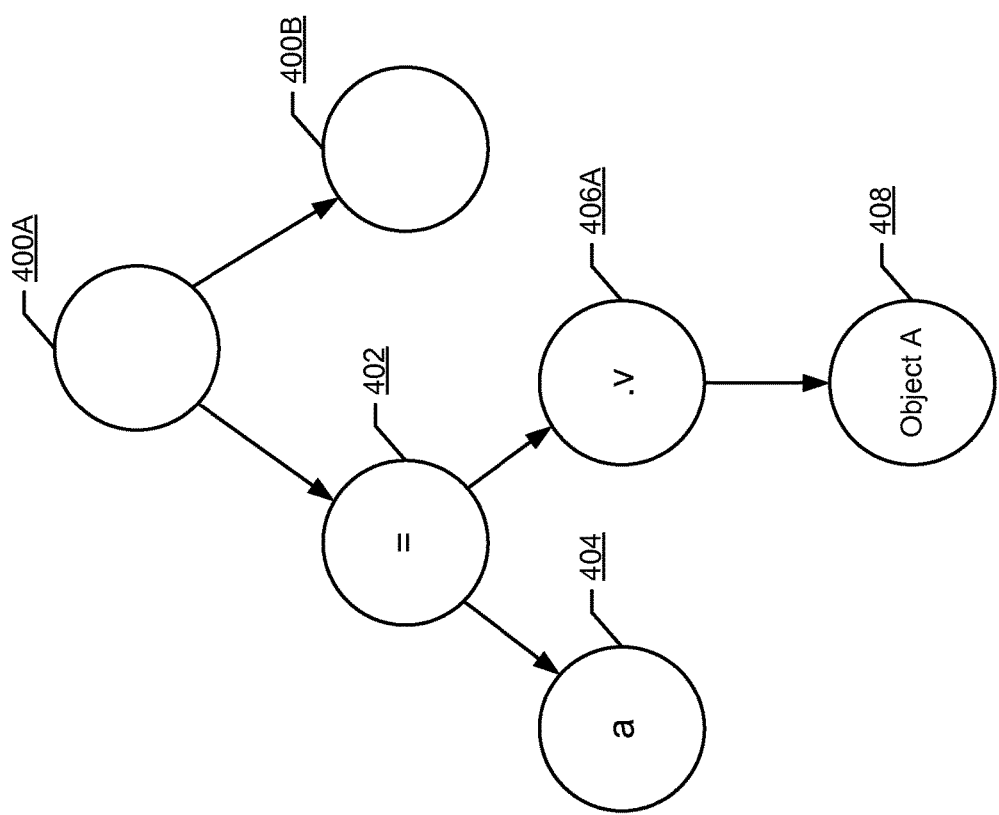
FIG. 4A, FIG. 4B, FIG. 4C, FIG. 4D, FIG. 4E, FIG. 4F, and FIG. 4G, show an example in accordance with one or more embodiments of the invention.

Consider a scenario, shown initially in FIG. 4A, which shows a portion of a cross-language IR representing a portion of a multiple language program. As shown in FIG. 4A, the cross-language IR is a cross-language AST. AST nodes 400A, 400B, 402 (i.e., the "=" node), and 404 (i.e., the "a" node) represent nodes corresponding to the main language of the multiple language program. Node 406A represents a foreign object access site. Node 408 represents a foreign object. The cross-language AST shown in FIG. 4A represents a portion of a multiple language program that has JavaScript as the main language, with the foreign object being accessed by an additional language, which in this example, is C.

Figure 4B:
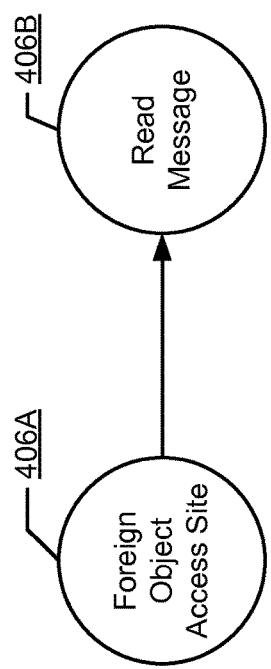
Figure 4C:
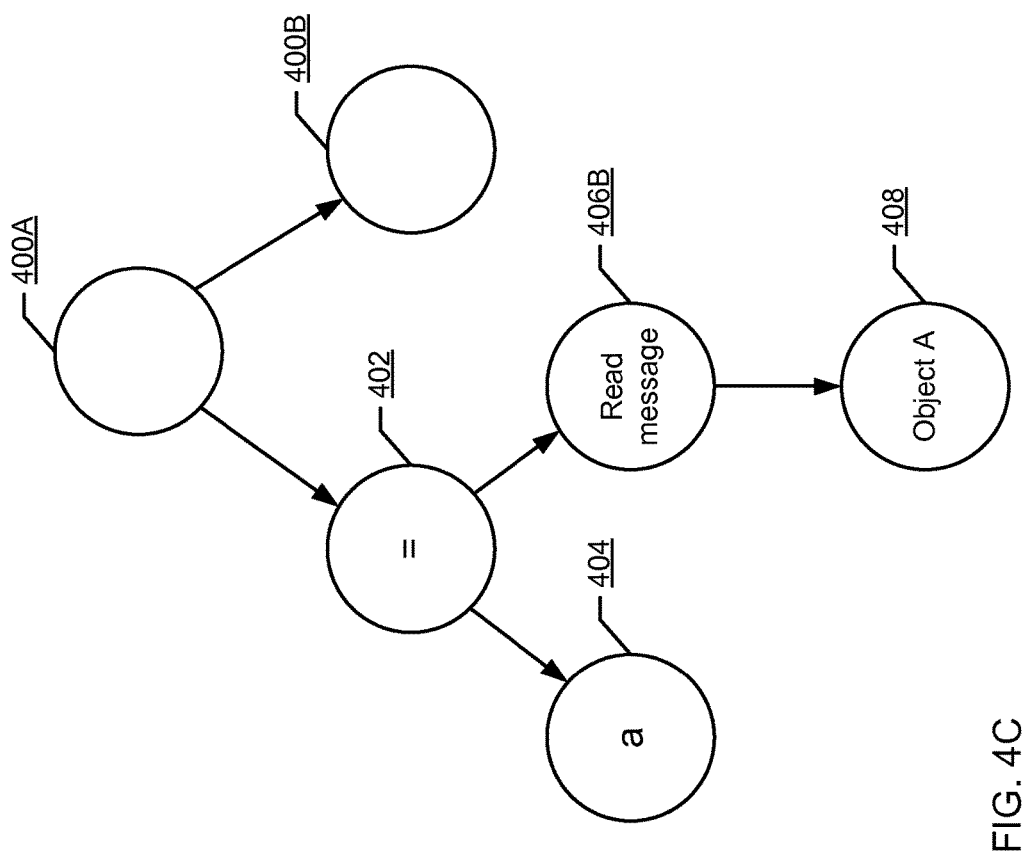

As shown in FIG. 4B, the foreign object access site is mapped to a message. In this example, the ".v" node 406A represents a read of a field of the foreign object, and is therefore mapped to a read message node 406B. The language independent read message 406B is then inserted into the cross-language AST in place of the original foreign object access site 406A of FIG. 4A. The resulting AST may be seen in FIG. 4C.

Figure 4D:
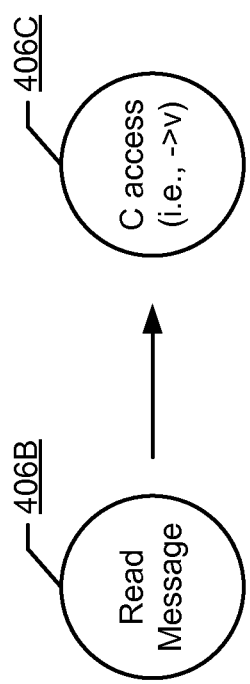

As shown in FIG. 4D, the language independent read message 406B is then mapped to an AST snippet implementing the use of C to access (e.g., read a field of) foreign object 408 of FIG. 4A. The mapping occurs via sending the read message 406B to the foreign object 408 (i.e., the receiver), which returns an AST snippet corresponding to an access of the foreign object via the C language (e.g., AST node 406C).

Figure 4E:
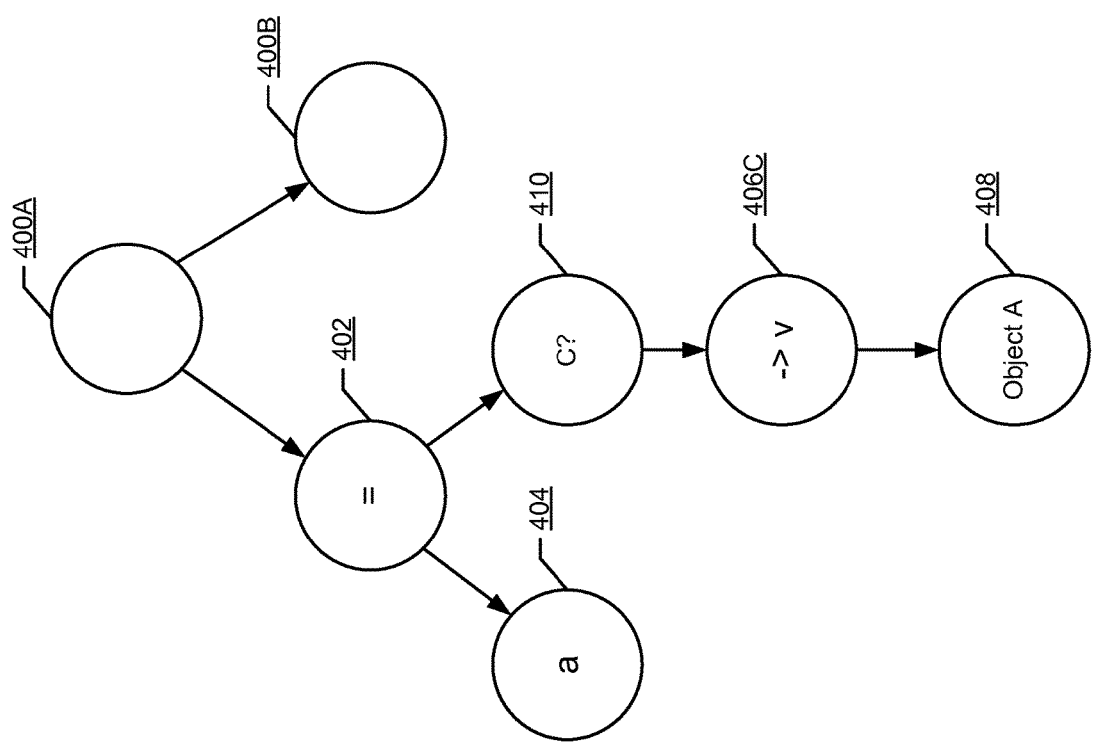

After appending a language check node for querying whether the language accessing the foreign object at the foreign object access site is C, the language check node and AST snippet of the C access are inserted into the AST, which may be seen in FIG. 4E. In FIG. 4E node 410 represents the language check node, and AST node 406C represents the AST snippet for performing the read via C. At this point, the AST shown in FIG. 4E is a cross-language AST that is a single compilation unit representing the multiple language program.

Figure 4F:
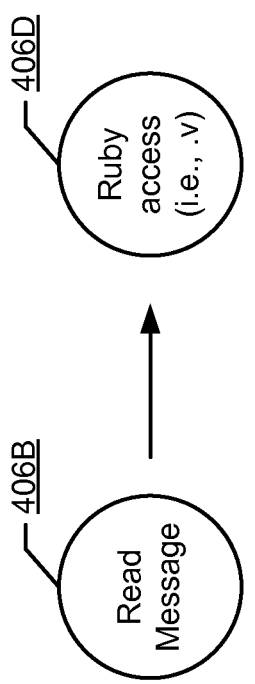

Continuing with the example, consider further a scenario in which the original foreign language access site 406A of FIG. 4A is a language polymorphic access, meaning that, during execution of the multiple language program before compilation, the foreign object to be accessed (i.e., read) changes to a new foreign object (shown as node 420 of FIG. 4G), causing the additional language used to access the foreign object to change to Ruby. In such a scenario, the message resolution process described above to insert the C AST snippet into the main language (i.e., Java Script) AST is repeated to obtain and insert an AST snippet corresponding to the Ruby access for the new foreign object. FIG. 4F shows that the read message node 406B is now mapped to a Ruby access 406D (i.e., AST node 406D). The mapping again occurs via sending the read message 406B to the new foreign object, which returns an AST snippet corresponding to an access of the mew foreign object via the Ruby language (e.g., AST node 406D).

Figure 4G:
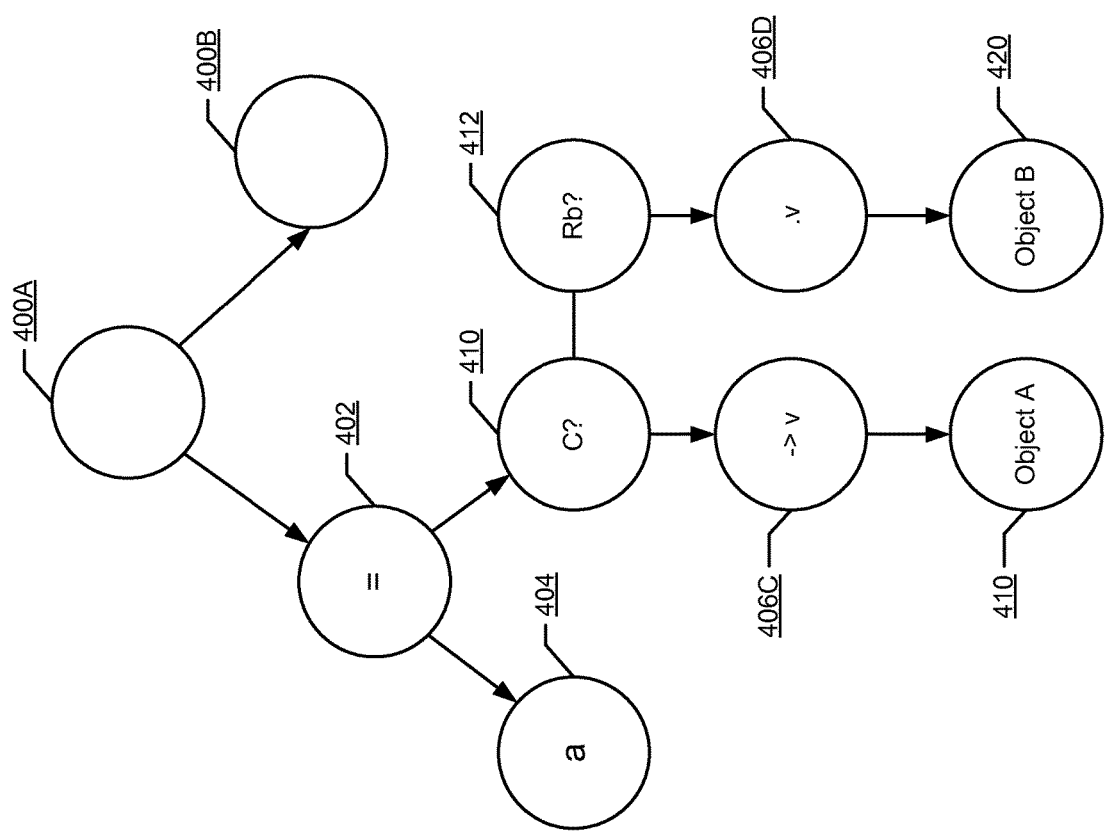

After appending another language check node (e.g., node 412 of FIG. 4G) for querying whether the language accessing the foreign object at the foreign object access site is Ruby, the language check node and AST snippet of the Ruby access are inserted into the AST, which may be seen in FIG. 4G. In FIG. 4G node 412 represents the language check node, and AST node 406D represents the AST snippet for performing the read via Ruby. The Ruby language check node 412 is appended to the AST as a chain off of the C language check node 410. Each time, during program execution, that the foreign object access site 406A of FIG. 4 is reached, a check will be performed to determine if the foreign object access site is the C access 406C, the Ruby access 406D, or some other foreign object access. In the event that the access is some other foreign object access, the above process will be repeated for as many different additional languages as are needed to account for the various accesses at the language polymorphic foreign object access site. At this point, the AST shown in FIG. 4G is a cross-language AST that represents a single compilation unit and accounts for a language polymorphic foreign object access site.

Figure 5:
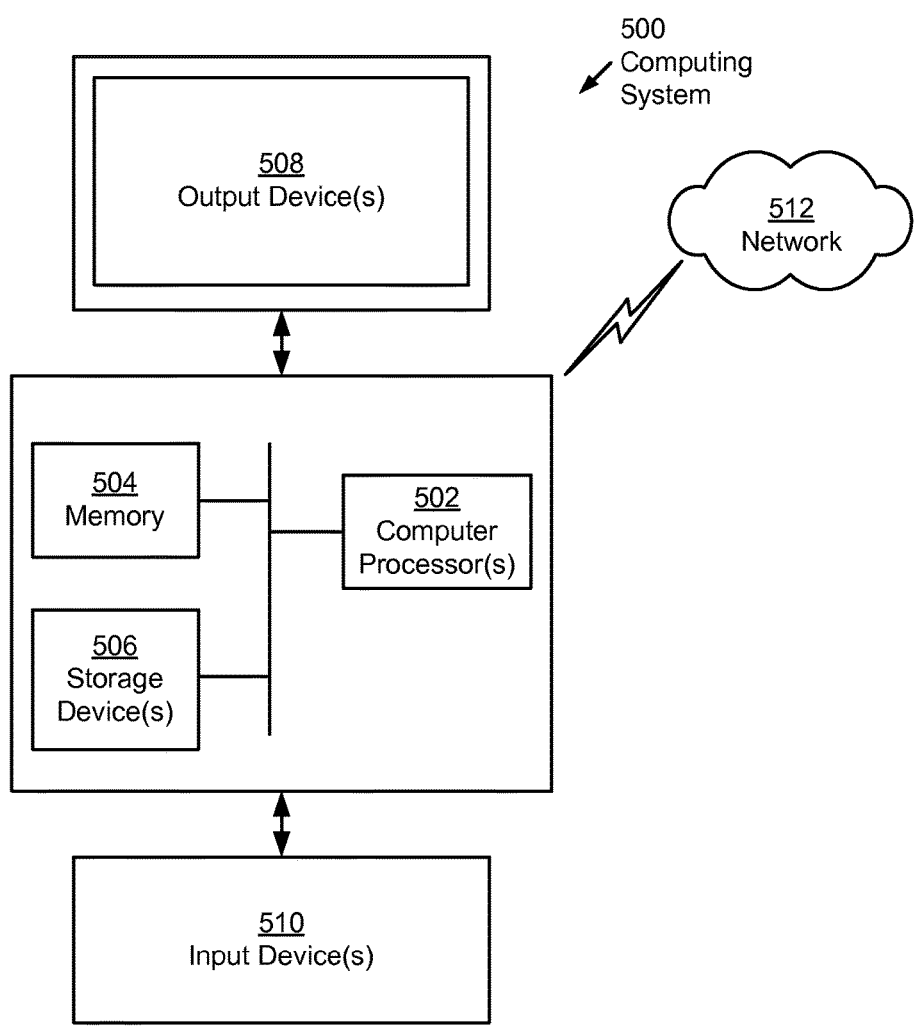
FIG. 5 shows a computing system in accordance with one or more embodiments of the invention.

Embodiments of the invention may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of cross-language inlining comprising:
receiving source code of a multiple language program, the source code comprising a main language and a first access of a first foreign object in a first additional language;
translating the main language to obtain a main language intermediate representation (IR); translating the first access of the first foreign object to obtain a first IR snippet;
composing, before performing a compilation, the main language IR and the first IR snippet to obtain a cross-language IR, wherein composing the main language IR and the first IR snippet comprises:
encountering, during execution of the main language IR, a foreign object access site for performing the first access of the first foreign object; and
adding a first language check element to the first IR snippet at the foreign object access site, wherein the first language check element determines that the first access of the first foreign object is in the first additional language; and
performing the compilation of the cross-language IR to obtain machine code corresponding to the multiple language program.

2. The method of claim 1, wherein composing the main language IR and the first IR snippet further comprises:
mapping the first access of the first foreign object to a first message;
inserting into the main language IR, at the foreign object access site, a first message element corresponding to the first message to obtain a first intermediate IR;
sending the first message to a first receiver corresponding to the first foreign object;
receiving, from the first receiver in response to sending the first message, the first IR snippet; and
inserting the first IR snippet into the first intermediate IR to obtain the cross-language IR, wherein the first language check element is executed before the first IR snippet.

3. The method of claim 2, wherein the first message comprises one selected from a group consisting of a read message, a write message, an execute message, and an unbox message.

4. The method of claim 2, wherein the foreign object access site is language polymorphic, the method further comprising:
executing, before the compilation, at least a portion of the multiple language program;
determining, while executing the portion of the multiple language program, that the first access of the first foreign object at the object access site has changed to a second access of a second foreign object via a second additional language;
mapping the second access of the second foreign object to a second message;
inserting a second message element corresponding to the second message into the first intermediate IR at the foreign object access site as part of a chain to obtain a second intermediate IR;
sending the second message to a second receiver corresponding to the second foreign object;
receiving, from the second receiver in response to sending the second message, a second IR snippet;
adding a second language check element to the second IR snippet to be executed before the second IR snippet;
inserting the second IR snippet into the second intermediate IR to obtain the cross-language IR, wherein the second language check element to be executed before the second IR snippet is inserted into the chain at the foreign object access site.

5. The method of claim 1, wherein the main language IR and the first IR snippet are each at least a portion of an abstract syntax tree (AST).

6. The method of claim 1, further comprising:
performing, before the compilation of the cross-language IR, a modification to obtain a modified cross-language IR;
determining that the modified cross-language IR has reached a stable state;
compiling the modified cross-language IR instead of the cross-language IR based on the determination.

7. The method of claim 1, wherein the cross-language inlining occurs in the cross-language IR and before the compilation of the cross-language IR.

8. The method of claim 1, wherein the cross-language IR comprises a single compilation unit.

9. A system for cross language inlining comprising:
a machine code generation unit comprising circuitry and configured to receive source code of a multiple language program, the source code comprising a main language and a first access of a first foreign object via a first additional language and comprising:
a first translator comprising circuitry and configured to translate the main language to obtain a main language intermediate representation (IR);
a second translator comprising circuitry and configured to translate the first access of the first foreign object to obtain a first IR snippet;
a cross-language IR generation module comprising circuitry and configured to compose the main language IR and the first IR snippet to obtain a cross-language IR, wherein the main language IR and the first IR snippet are configured to perform:
encountering, during execution of the main language IR, a foreign object access site for performing the first access of the first foreign object; and
adding a first language check element to the first IR snippet at the foreign object access site, wherein the first language check element determines that the first access of the first foreign object is in the first additional language; and
a compiler comprising circuitry and configured to perform a compilation of the cross-language IR to obtain machine code corresponding to the multiple language program.

10. The system of claim 9, wherein the main language IR and the first IR snippet are further configured to perform:
mapping the first access of the first foreign object to a first message;
inserting into the main language IR, at the foreign object access site, a first message element corresponding to the first message to obtain a first intermediate IR;
sending the first message to a first receiver corresponding to the first foreign object;
receiving, from the first receiver in response to sending the first message, the first IR snippet; and inserting the first IR snippet into the first intermediate IR to obtain the cross-language IR, wherein the first language check element is executed before the first IR snippet.

11. The system of claim 10, wherein the first message comprises one selected from a group consisting of a read message, a write message, an execute message, and an unbox message.

12. The system of claim 10, wherein the foreign object access site is language polymorphic, and wherein the cross-language IR generation module is further configured to compose the cross-language IR by:
   executing, before the compilation, at least a portion of the multiple language program;
   determining, while executing the portion of the multiple language program, that the first access of the first foreign object at the foreign object access site has changed to a second access of a second foreign object via a second additional language;
   mapping the second access of the second foreign object to a second message;
   inserting a second message element corresponding to the second message into the first intermediate IR at the foreign object access site as part of a chain to obtain second a second intermediate IR;
   sending the second message to a second receiver corresponding to the second foreign object;
   receiving, from the second receiver in response to sending the second message, a second IR snippet;
   adding a second language check element to the second IR snippet to be executed before the second IR snippet;
   inserting the second IR snippet into the second intermediate IR to obtain the cross-language IR, wherein the second language check element to be executed before the second IR snippet is inserted into the chain at the foreign object access site.

13. The system of claim 12, wherein the main language IR and the first IR snippet are each at least a portion of an abstract syntax tree (AST).

14. The system of claim 9,
   wherein the machine code generation unit further comprises an IR modification module comprising circuitry and configured to:
      perform, before the compilation of the cross-language IR, a modification to obtain a modified cross-language IR; and
      determine that the modified cross language IR has reached a stable state; and
   wherein the compiler is further configured to:
      compile the modified cross-language IR instead of the cross-language IR based on the determination.

15. A non-transitory computer readable medium comprising instructions that, when executed by a computer processor, perform a method of cross-language inlining comprising:
   receiving source code of a multiple language program, the source code comprising a main language and a first access of a first foreign object in a first additional language;
   translating the main language to obtain a main language intermediate representation (IR);
   translating the first access of the first foreign object to obtain a first IR snippet;
   composing, before performing a compilation, the main language IR and the first IR snippet to obtain a cross-language IR, wherein composing the main language IR and the first IR snippet comprises:
      encountering, during execution of the main language IR, a foreign object access site for performing the first access of the first foreign object; and
      adding a first language check element to the first IR snippet at the foreign object access site, wherein the first language check element determines that the first access of the first foreign object is in the first additional language; and
   performing the compilation of the cross-language IR to obtain machine code corresponding to the multiple language program.

16. The non-transitory computer readable medium of claim 15, wherein composing the main language IR and the first IR snippet further comprises:
   mapping the first access of the first foreign object to a first message;
   inserting into the main language IR, at the foreign object access site, a first message element corresponding to the first message to obtain a first intermediate IR;
   sending the first message to a first receiver corresponding to the first foreign object;
   receiving, from the first receiver in response to sending the first message, the first IR snippet; and
   inserting the first IR snippet into the first intermediate IR to obtain the cross-language IR, wherein the first language check element is executed before the first IR snippet.

17. The non-transitory computer readable medium of claim 16, wherein the first message comprises one selected from a group consisting of a read message, a write message, an execute message, and an unbox message.

18. The non-transitory computer readable medium of claim 16, wherein the foreign object access site is language polymorphic, the method further comprising:
   executing, before the compilation, at least a portion of the multiple language program;
   determining, while executing the portion of the multiple language program, that the first access of the first foreign object at the foreign object access site has changed to a second access of a second foreign object via a second additional language;
   mapping the second access of the second foreign object to a second message;
   inserting a second message element corresponding to the second message into the first intermediate IR at the foreign object access site as part of a chain to obtain a second intermediate IR;
   sending the second message to a second receiver corresponding to the second foreign object;
   receiving, from the second receiver in response to sending the second message, a second IR snippet;
   adding a second language check element to the second IR snippet to be executed before the second IR snippet;
   inserting the second IR snippet into the second intermediate IR to obtain the cross-language IR, wherein the second language check element to be executed before the second IR snippet is inserted into the chain at the foreign object access site.

19. The non-transitory computer readable medium of claim 15, further comprising:
   performing, before the compilation of the cross-language IR, a modification to obtain a modified cross-language IR;
   determining that the modified cross-language IR has reached a stable state;
   compiling the modified cross-language IR instead of the cross-language IR based on the determination.

20. The non-transitory computer readable medium of claim 15, wherein the cross-language inlining occurs in the cross-language IR and before the compilation of the cross-language IR, and wherein cross-language IR comprises a single compilation unit.

\* \* \* \* \*

UNITED STATES PATENT AND TRADEMARK OFFICE
CERTIFICATE OF CORRECTION

PATENT NO. : 9,740,463 B2
APPLICATION NO. : 14/822489
DATED : August 22, 2017
INVENTOR(S) : Grimmer et al.

It is certified that error appears in the above-identified patent and that said Letters Patent is hereby corrected as shown below:

In Column 17, Line 25, in Claim 12, before "a" delete "second".

Signed and Sealed this
Twenty-second Day of May, 2018

Andrei Iancu
*Director of the United States Patent and Trademark Office*